April 14, 1942.  S. T. FORESMAN ET AL  2,279,977
FLUID COUPLING BALANCING
Filed March 1, 1939
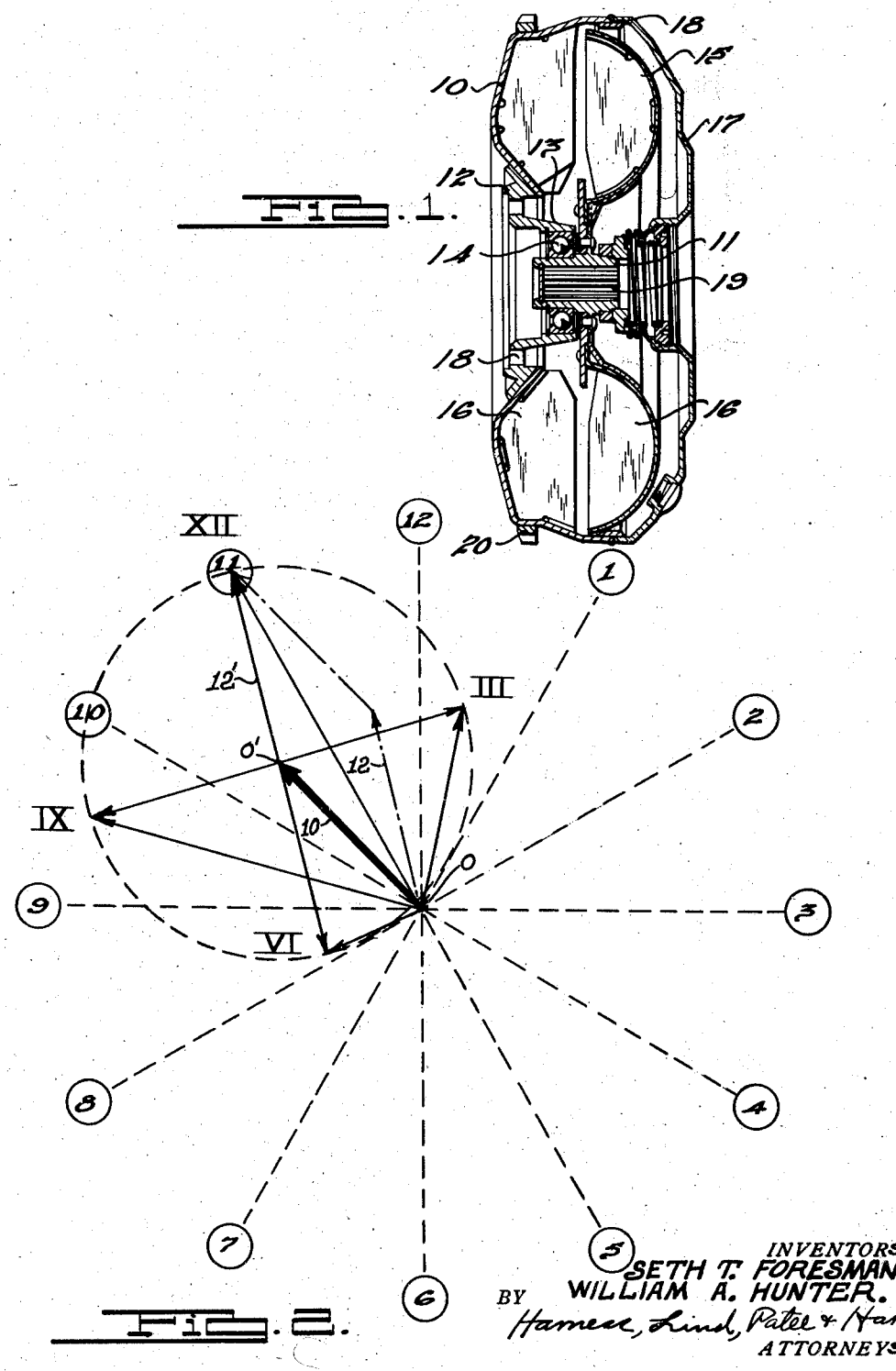
INVENTORS.
SETH T. FORESMAN AND
BY WILLIAM A. HUNTER.
ATTORNEYS.

Patented Apr. 14, 1942

2,279,977

UNITED STATES PATENT OFFICE 2,279,977

FLUID COUPLING BALANCING

Seth T. Foresman, Royal Oak, and William A. Hunter, Highland Park, Mich., assignors to Chrysler Corporation, Highland Park, Mich., a corporation of Delaware Application March 1, 1939, Serial No. 259,296

7 Claims. (Cl. 73—53)

This invention relates to a method of determining the amounts and angular positions of the unbalances in a fluid coupling.

Fig. 1 of the drawing illustrates a fluid coupling of the type generally known as the Fottenger type. These couplings are used for forming a torque transmitting connection between a drive shaft and a driven shaft, such as the crankshaft and transmission input shaft of a motor vehicle. The coupling illustrated in the drawing comprises an impeller 10 which is adapted to be driven through a hub portion 12 welded thereto and provided with a cylindrical portion 13 forming a seat for the outer race of a bearing 14.

The driven or runner element of the coupling comprises a dished annular member 15 provided with an internally splined hub portion 11 which carries the inner race of the bearing 14.

Both the impeller and runner are provided with a plurality of vanes 16 forming passages through which the working fluid is adapted to circulate under the influence of centrifugal force when the impeller is rotated.

A rear casing member 17, welded to the impeller at 18, encloses the runner and prevents escape of fluid. The coupling is adapted to be drivingly connected to an engine crankshaft by bolts passed through the holes 18, and to the input shaft of a change speed transmission through the splines 19. The numeral 20 designates the usual starter ring gear which is adapted to be engaged by the driving pinion of the regular vehicle starting mechanism.

Because of the manufacturing inaccuracies which cannot readily be eliminated in large scale production, fluid couplings of the type shown in Fig. 1 are slightly out of balance when assembled. It is known that there are three factors which contribute to this unbalance, viz., unbalance in the impeller and entrained fluid, unbalance in the runner due to eccentricity between the axes of rotation of the impeller and runner, and unbalance in the runner about its own rotational axis.

The angular location of the resultant of the first two unbalances is constant relative to the rotational axis of the impeller, and while the magnitude of the third is constant, it may assume various angular positions relative to said axis because of the fact that during normal operation, the runner has a certain amount of "slippage" relative to the impeller.

Before our invention, the unbalance in fluid couplings of the type referred to was determined in a number of ways, the method used in most instances requiring three different operations. The runner was filled with paraffin (which has approximately the same specific gravity as the mineral oil normally contained in the couplings) which was allowed to harden, then the unbalance of the runner was found on a balancing machine. The same procedure was followed with the impeller and the rear casing member 17, the latter being run dry. It was then necessary to melt the paraffin out of the runner and impeller before assembly. Obviously, this method is not adapted to be used in large scale production.

With our method, the unbalance of the coupling is found in one operation after the coupling has been assembled and filled with its working fluid.

In the accompanying drawing,

Fig. 1 is a longitudinal sectional view of a fluid coupling of the type herein referred to.

Fig. 2 is a vectorial representation of the unbalance forces in a typical fluid coupling as determined by our method.

The first step in our method consists in determining the amount and direction of the total resultant unbalance in the coupling at various positions of the runner relative to the impeller.

This may be done by mounting the coupling (which has been filled with fluid to the normal level) on a balancing machine and rotating it with the runner indexed in various positions relative to the impeller. Any type of commercially available balancing machine may be used, such as, for example, that known as the "Olsen Lundgren Cradle Type" machine; the requirements being that the machine must be capable of rotating the coupling with sufficient speed to cause a void of oil at the axis of rotation and of measuring both the magnitude and angular location with respect to the axis of the resultant unbalance of a rotating member. This type of balancing machine is widely used in the automotive industry in crankshaft balancing operations.

The coupling is mounted in the machine and both the impeller and runner members are divided into an imaginary clock dial. A run is then taken with 12 o'clock on the runner indexing with 12 o'clock on the impeller and the magnitude and angular location of the total resultant unbalance is determined and recorded.

A second run is then taken with 12 o'clock on the runner indexing with 3 o'clock on the impeller and the magnitude and direction of the total resultant determined and recorded. This procedure is repeated with 12 o'clock on the runner indexing with 6 and 9 o'clock respectively on the impeller.

By way of example, the results obtained in a typical operation are reproduced below.

| Position of runner | Angular location of total resultant | Magnitude of total resultant in oz. in. |
|---|---|---|
| 12 | 11:00 | 16.00 |
| 3 | 12:25 | 8.30 |
| 6 | 8:15 | 4.25 |
| 9 | 9:30 | 14.25 |

Referring now to Fig. 2 of the drawing, it will be noted that the test data reproduced above has been plotted vectorially on an imaginary clock dial. The vectors designated by the Roman Numerals represent the magnitude and angular location of the total resultant unbalance of the whole coupling assembly when 12 o'clock on the runner indexed with 12, 3, 6 and 9 o'clock respectively on the impeller.

From the diagram it may be seen that as the runner is indexed around the impeller, the tip of the vector representing the total resultant unbalance of the coupling will describe a circle. In other words, the locus of the total resultant unbalance is a circle. This may be explained as follows.

Assuming that there is zero unbalance in the impeller, and that the axis of rotation of the impeller and runner coincide, it is evident that the magnitude of the unbalance in the runner is constant and its position relative to the impeller will depend upon the angular position of the runner relative to the impeller. This unbalance will rotate as the runner rotates relative to the impeller and the tip of the vector representing this unbalance will describe a circle when the relative movement equals 360°.

Assuming that there is zero unbalance in the runner, the resultant of the unbalance in the impeller plus the unbalance caused by eccentricity of the axis of rotation of the runner relative to the axis of rotation of the impeller is fixed in magnitude and angular location relative to the impeller.

The tip of the vector representing the unbalance in the runner will describe a circle regardless of the unbalance of the impeller, and the tip of the vector representing the combined (or resultant) unbalance of the impeller plus that caused by the eccentricity of the runner axis of rotation will remain constant in magnitude and angular location relative to the impeller regardless of the unbalance of the runner. It therefore follows that the readings taken as described above are vector quantities and may be written or represented by vectors of corresponding length and direction.

For example the magnitude and location of the total resultant of the unbalances in the impeller and runner may be obtained vectorially by plotting the length of the fixed vector representing the unbalance in the impeller and from the tip of this vector plotting the vector representing the unbalance in the runner, which can assume any angular location. The total resultant unbalance is the vector from the reference axis to the tip of the vector representing the unbalance of the runner. Then the tip of the vector representing the unbalance in the runner which coincides with the tip of the vector representing the total resultant unbalance will describe a circle whose radius is equal to the unbalance in the runner.

From the above, it follows that the radius of the circle represents the magnitude of the unbalance in the runner, the angular location of which may be readily determined by taking the vector 12' (which represents the unbalance in the runner when 12 o'clock on the runner was indexed with 12 o'clock on the impeller) and transposing it to the position indicated by the dotted vector 12 in Fig. 2. The vector 12 will then represent the true unbalance in the runner both as to magnitude and angular position with reference to the axis of rotation of the whole coupling assembly.

It is also apparent that the vector drawn from the reference axis 0 to the center of the circle 0' represents the magnitude and the true angular location of the resultant of the unbalance in the impeller and fluid plus the unbalance due to eccentricity of the runner with respect to the impeller.

For the coupling used in this example, these values may be read directly off of the clock diagram and will be found to be as follows: impeller, including entrained fluid and eccentricity of runner (vector 10) 8:40 oz. in. heavy at 10:30 o'clock; runner, including entrained fluid (vector 12) 8:00 oz. in. heavy at 11:30 o'clock.

In order to prove the above described vector analysis and further clarify the method, let us reverse the method and determine the total resultant unbalance of the coupling assuming that the magnitude and angular position of each of the component unbalances, which together make up the total resultant unbalance, are known. Then the component unbalance in the impeller, including entrained fluid and eccentricity of the runner, may be plotted on the clock diagram as vector 10. The vector representing the unbalance in the runner may then be plotted on the diagram. The length of this latter vector will be fixed because the magnitude of the unbalance is fixed; but, because the runner rotates relative to the impeller, the angular position of this vector will not reman fixed but will sweep through 360°. It is clear that as we are now determining the total resultant unbalance, the vector 10 will represent one component of the total resultant and the vector 12 will represent the other component when 12 o'clock on the runner is indexing with 12 o'clock on the impeller. By completing the parallelogram, the resultant vector, XII on the diagram, may be drawn which of course represents the total resultant unbalance for the instant when 12 o'clock on the runner is indexing with 12 o'clock on the impeller.

The magnitude of the total resultant unbalance then will be greatest at the instant when the two component unbalances are in the same angular position relative to the axis 0 and least at the instant when the two component unbalances are directly opposing each other. The tip of the vector representing the total resultant unbalance will therefore describe a circle about the tip of the vector 10 (which is fixed in both magnitude and position).

It will thus be seen that we have provided a quick, accurate and efficient method for determining the magnitude and angular location of the unbalance in each of the members of the fluid coupling in a single operation. Our method not only locates and separates the unbalance in each of the members, but it is also self-checking, as the unbalance vector of the runner must rotate through the same angle the runner was turned in its travel from one index position to the next.

In taking test readings, the runner may be indexed to as many different test positions as desired. In practice two readings only are taken. These are taken with the runner locked in two positions 180° apart respectively with respect to the impeller. It is obvious in view of the above explanation that any two such readings taken 180° apart will define the diameter of the circle when plotted on the diagram. Thus it is only necessary to draw a line between the two plotted points representing these readings and find the midpoint thereof which will define the tip of the vector 10. The two most convenient readings to take are those represented by XII and VI on the diagram of Fig. 2.

Our improved method in its simplest form therefore consists of the following steps: the impeller and runner are locked together, rotated and a reading is taken which is plotted as XII of Fig. 2. The runner is rotated 180° with respect to the impeller, the two are locked together, rotated and reading VI is taken and plotted. The vector 10 is drawn from 0 to 0' (which is midway between XII and VI) and the vector 12' is drawn from 0' to XII. Vectors 10 and 12 then represent respectively the magnitude of the unbalances in the impeller and runner and their respective angular positions in degrees with respect to the line 12—6.

After determining the magnitude and location of the unbalance in the coupling members, it is a simple matter to bring the parts into perfect mechanical balance by removing the requisite amount of metal from the heavy side of the axis of rotation thereof, or by adding the proper amount to the light side.

The method above set forth has been described for use in conjunction with the balancing of fluid couplings. It is desired to point out, however, that it may be used in determining the resultant and component unbalances in any rotatable assembly wherein one or more parts also rotate relative to each other, and it is further desired to point out that methods of treating the data different from the graphical one set forth herein may be resorted to without departing from the spirit of our invention.

Having thus described our invention, that which we claim as new and desire to protect by Letters Patent is set forth in the following claims.

We claim:

1. The method of determining and separating the unbalances in the members of a fluid coupling which comprises mounting said coupling on a balancing apparatus of any suitable type which will measure the magnitude and angular position of the total resultant running unbalance in the coupling and taking a series of readings with the runner of said coupling locked in a series of selected rotative positions with respect to the impeller thereof, plotting said readings in vector form on a diagram in such manner that each of said readings will be represented by a vector of corresponding length and angularity, and inscribing the circle defined by the tips of said vectors, then drawing a vector from the reference axis of said diagram to the center of said inscribed circle which will represent the resultant unbalance in the impeller, next drawing a vector from the center of said inscribed circle to the tip of the vector representing the first reading taken which will represent the resultant unbalance in the runner.

2. The method of determining the unbalance of one member of a rotatable assembly having relatively rotatable members comprising, determining the magnitude and angular position of the resultant unbalance of the assembly at the instant when a selected point on said one member is indexing with a selected point on a second of said members, repeating the aforesaid determination for the instants when at least two additional selected points on said second member are indexing respectively with said selected point on said one member, plotting the results thus obtained as vectors, drawing a circle through the tips of said vectors, and drawing a vector from the reference axis to the center of said circle which will represent the unbalance of said one member.

3. The method of determining the unbalance of one member of a rotatable assembly having relatively rotatable members comprising, determining the magnitude and angular position of the resultant unbalance of the assembly at the instant when a selected point on said one member is indexing with a selected point on a second of said members, repeating the aforesaid determination for the instant when another selected point on said one member spaced 180° from the first selected point is indexed with said selected point on said second member, plotting the results thus obtained as vectors, drawing a line between the tips of the two vectors thus plotted, and drawing a vector from the reference axis to the midpoint of said line which will represent the unbalance of said one member.

4. In balancing a rotatable assembly which comprises a pair of members adapted for relative rotation during rotation of the assembly, the method of separating the total running unbalance of the assembly into component unbalances associated with the respective members, which comprises, supporting the assembly for substantial transaxial vibration and measuring the magnitude and angular position relatively to the rotational axis of the total running unbalance during rotation at desired speed with one of the members indexed at different rotative positions relatively to the other member; representing the measurements thus taken as vectors, the tips of which will define a circle representing the path of travel of the unbalance in the one member relatively to the rotative axis during relative rotation of the members; then determining the position of the center of said circle with respect to the rotative axis which quality represents the magnitude and angular position relatively to the rotative axis of the unbalance in the other member.

5. In balancing a rotatable assembly which comprises a pair of members adapted for relative rotation during rotation of the assembly, the method of separating the total running unbalance of the assembly into component unbalances associated with the respective members, which comprises, supporting the assembly for substantial transaxial vibration and measuring the magnitude and angular position relatively to the rotational axis of the total running unbalance during rotation at desired speed with one of the members indexed at different rotative positions relatively to the other member; representing the measurements thus taken as vectors, the tips of which will define a circle representing the path of travel of the unbalance in the one member relatively to the rotative axis during relative rotation of the members; then determining the position of the center of said circle with respect to the rotative axis which quantity represents the magnitude and angular position relatively to the rotative axis of the unbalance in the other member; then determining the length and position of the radius of said circle, with respect to one of the aforesaid index positions, which quantity will represent the magnitude and angular position of the unbalance in said one member.

6. The method of analyzing the unbalances in a fluid coupling which comprises, supporting the coupling for transaxial vibration and measuring the magnitude and angular position relatively to the rotational axis of the total running unbalance thereof during rotation at desired speed with the runner indexed at different rotative positions relatively to the impeller; representing the measurements thus taken as vectors, the tips of which will define a circle representing the path of travel of the unbalance in the runner relatively to the rotative axis during normal operation of the coupling; then determining the position of the center of said circle with respect to the rotative axis which quantity represents the magnitude and angular position relatively to the rotative axis of the unbalance in the impeller.

7. The method of analyzing the unbalances in a fluid coupling which comprises, supporting the coupling for transaxial vibration and measuring the magnitude and angular position relatively to the rotational axis of the total running unbalance during rotation at desired speed with the runner indexed at different rotative positions relatively to the impeller; representing the measurements thus taken as vectors, the tips of which will define a circle representing the path of travel of the unbalance in the runner relatively to the rotative axis during normal operation of the coupling; then determining the position of the center of said circle with respect to the rotative axis which quantity represents the magnitude and angular position relatively to the rotative axis of the unbalance in the impeller; then determining the length and position of the radius of said circle, with respect to one of the aforesaid index positions, which quantity will represent the magnitude and angular position of the unbalance in the runner.

SETH T. FORESMAN.
WILLIAM A. HUNTER.